US008050794B2

(12) United States Patent
Berger et al.

(10) Patent No.: US 8,050,794 B2
(45) Date of Patent: Nov. 1, 2011

(54) METHOD AND DEVICE FOR TRANSPORTING ITEMS

(75) Inventors: Gisbert Berger, Berlin (DE); Jörg-Andreas Illmaier, Kruezlingen (CH)

(73) Assignee: Siemens Aktiengesellschaft, Munich (DE)

(*) Notice: Subject to any disclaimer, the term of this patent is extended or adjusted under 35 U.S.C. 154(b) by 583 days.

(21) Appl. No.: 12/212,672

(22) Filed: Sep. 18, 2008

(65) Prior Publication Data

US 2009/0076649 A1 Mar. 19, 2009

(30) Foreign Application Priority Data

Sep. 18, 2007 (DE) ........................ 10 2007 044 735
Jan. 31, 2008 (DE) ........................ 10 2008 007 009
Apr. 4, 2008 (DE) ........................ 10 2008 017 190

(51) Int. Cl.
*B07C 5/00* (2006.01)
*G06K 9/00* (2006.01)
*G06F 7/00* (2006.01)
*G06F 19/00* (2006.01)

(52) U.S. Cl. ........ 700/228; 700/225; 700/115; 209/284; 209/900

(58) Field of Classification Search ........................ None
See application file for complete search history.

(56) References Cited

U.S. PATENT DOCUMENTS 6,703,574 B1 3/2004 Kechel et al.
6,888,084 B1 * 5/2005 Bayer .......................... 209/584
7,674,995 B2 * 3/2010 Desprez et al. .............. 209/584
2005/0269395 A1 12/2005 Miette et al.
2007/0215529 A1 9/2007 Desprez et al.
2008/0149540 A1 6/2008 Olivier et al.
2009/0285486 A1 11/2009 Berger et al.

FOREIGN PATENT DOCUMENTS

DE 40 00 603 C2 7/1991
DE 199 47 259 C1 9/2000
DE 10 2005 040 689 A1 3/2007
EP 0 948 416 B1 10/1999
EP 1 222 037 B1 7/2002
FR 2 881 663 A1 8/2006
WO 2006/100357 A1 9/2006
WO 2007/022876 A1 3/2007

* cited by examiner

*Primary Examiner* — Gene Crawford
*Assistant Examiner* — Yolanda Cumbess
(74) *Attorney, Agent, or Firm* — Laurence A. Greenberg; Werner H. Stemer; Ralph E. Locher

(57) ABSTRACT

A method and a device for transporting items, in particular mail items. uses multiple transport processes for transporting the items respectively to a processing system. For each item, a measurement is made before the transportation as to whether the item has a predefined characteristic, and if so, in what form. This measurement is executed afresh, after the item is fed to a processing system. For each item, it is determined by means of which transport process the item has been transported. To this end, it is determined which items with what form of the characteristic have been transported by means of which transport process.

6 Claims, 4 Drawing Sheets

METHOD AND DEVICE FOR TRANSPORTING ITEMS

CROSS-REFERENCE TO RELATED APPLICATION

This application claims the priority, under 35 U.S.C. §119, of German applications DE 10 2007 044 735.5, filed Sep. 18, 2007, DE 10 2008 007 009.2, filed Jan. 31, 2008 and DE 10 2008 017 190.5, filed Apr. 4, 2008; the prior applications are herewith incorporated by reference in their entirety.

BACKGROUND OF THE INVENTION

Field of the Invention

The invention relates to a method and a device for transporting items, in particular items of mail.

A mail item typically passes through a sorting system at least twice and is then transported to the respectively predefined destination address. The destination address of the mail item is read during the first pass. The read destination address is determined again during the second pass.

Traditionally, a coding of the destination address is printed onto the mail item during the first pass. This coding is read during the second pass. In order to avoid printing on mail items, German patent DE 40 00 603 C2 proposes to measure a feature vector of the mail item during the first pass and to store this feature together with the read destination address. During the second pass, the mail item is measured afresh, a further feature vector being generated by this means. This further feature vector is compared with the stored feature vectors in order to find the stored feature vector of the same item. The destination address which is stored together with the found feature vector is used as the destination address to which the mail item is to be transported.

This search requires that many feature vectors be compared with one another, which is time-consuming. As the number of transported mail items grows, the risk that the wrong feature vector will be found among the stored feature vectors increases. Restrictions on the search space have therefore already been proposed.

A prior art method, upon which the instant application builds, is described in the commonly assigned European patent EP 1222037 B1 and its counterpart U.S. Pat. No. 6,888,084 B1. The items there are likewise mail items which pass through sorting machines. Such a sorting machine discharges mail items into sorting terminals which function as intermediate stores. In order to reuse read results, a method is used which is known as fingerprinting and which is described, for example, in the commonly assigned German patent DE 4000603 C2.

For each mail item, a data record is generated and filed in a central database. This data record comprises the read delivery address. In order to restrict the search space when searching for this data record, a record is stored of which mail item is transported in which container. This approach requires that it be known precisely which mail item is transported in which container. In reality, this can sometimes not be established with sufficient certainty.

Commonly assigned German published patent application DE 10 2005 040 689 A1 proposes that a mail item be identified in two steps. Firstly, the mail item is registered e.g. in a central database by means of a visual feature and an external piece of information. As soon as this mail item passes through a sorting system for a second time, an attempt is made firstly to identify this mail item on the basis of the visual feature. If this is unsuccessful, the mail item is identified on the basis of the external feature.

SUMMARY OF THE INVENTION

It is an object of the invention is to provide a method as summarized above and a corresponding device which avoids the short-comings of the prior art and provides for an improved method and device in which it is not necessary to identify the transport means which are used for the transport processes.

With the above and other objects in view there is provided, in accordance with the invention, a method for transporting multiple items, such as mail items. The method comprises the following steps:

performing multiple transport processes each including the following steps:

- transferring at least one item respectively into a transport means;
- transporting the transport means with the at least one item to a processing system; and
- feeding all of the items transported with the transport means to the processing system before further items are fed to the processing system; and before the item is transferred into one of the transport means, performing a first measurement for each item as to whether or not the item possesses a given optically measurable characteristic and, if so, in what form the item possesses the characteristic;

- determining and storing for each transport process transport-process information as to which items are transported together by way of the specific transport process, and storing the result of the first measurement as a component part of the transport-process information of the particular transport process by means of which the specific item is transported;

for each transport process, after transportation of the transport means to the respective processing system:

- measuring whether or not at least one item with the predefined characteristic was fed by way of the respective transport process to the processing system and, if so, in what form the item possesses the characteristic;
- determining, from the stored transport-process information, each transport process by way of which an item with the given form of the characteristic was transferred into a transport means and transported therein; and
- performing a transport-process search to ascertain the transport process with which the item has been transported and thereby using as a result of the search, for each item which was fed by means of this transport process to the processing system, the set of transport processes thus determined.

In other words, multiple items are transported by means of different transport processes. In each of these transport processes, the following steps are executed:

- At least one item is transferred into a transport means in each case.
- The transport means with the at least one item is transported to a processing system.

The items transported with the transport means are fed into the processing system. In the process, any mixing with items from other transport processes is avoided. This is achieved whereby the items of this transport process are fed in such a manner that firstly all the items from the transport means of this transport process are fed into the processing system before further items are fed into the processing system.

At least one feature is predefined. According to the solution, this feature has the form of an optically measurable characteristic. A transported item either has this characteristic in one of various possible forms, or the item does not have the characteristic.

For each item, a measurement is made for a first time of what value this predetermined feature assumes for this item. Here, a measurement is made of whether this item has the predefined characteristic or not and, if so, in what form it possesses this characteristic. This first measurement is executed before this item is transferred into one of the transport means.

Transport-process information concerning which items are transported together by means of this transport process and what feature value each of these items assumes, is determined and stored for each transport process. The results of the first measurements are used for this purpose. The transport-process information comprises for each item the information concerning whether or not this item has the characteristic predefined in the first measurement and, if so, in what form it possesses this characteristic.

After this item has been fed to the respective processing system, a fresh measurement is made of what value the feature assumes for this item. Here, a fresh measurement is made of whether or not this item has the characteristic predefined in the first measurement and, if so, in what form it possesses this characteristic.

Subsequently, an automatic search is executed to ascertain the transport process by means of which this item has been transported. The transport-process information of each transport process is used for this search. Each transport process by means of which an item with this form of the characteristic has been transferred into a transport means and transported in this transport means is determined.

The transport process by means of which the item has been transported is determined for each item accordingly. To this end, it is determined and analyzed which items with which form of the characteristic have been transported by which transport process.

The invention utilizes the fact that only very few items—often only a single one—have a certain form of the characteristic. The transport process—or at least the transport processes which remain eligible—can be determined without it being necessary to identify the transport means used. Such an identification would require a machine-readable or human-readable identifier, e.g. in the form of a bar code, and may be susceptible to errors.

The susceptibility to errors is further reduced by multiple characteristics being predefined and used for determining transport processes. The susceptibility to errors is also reduced by a search being made for multiple items with the characteristic and by the different forms of these found items being taken into consideration.

Furthermore, preferably at least one measurable transport attribute is predefined. This transport attribute is, for example, the respective destination address to which the item is to be transported or a dimension or a weight or e.g. the evaluation of a franking mark with which the item is furnished.

Before an item is transferred into one of the transport means, the following steps are executed:

- A measurement is made of what value the transport attribute assumes for this item.
- A data record for the item is generated and stored. This data record comprises the measured transport-attribute value and each feature value measured during the first measurement.

After this item has been fed into the respective processing system, the following steps are executed:

- The stored data record for the item is determined. Each feature value measured during the fresh measurement is used for this determination.
- In the determination process, the search is restricted to the data records of those items which have been transported in one of the determined transport processes.
- Further transportation of the item is triggered. The transport-attribute value of the determined data record, e.g. the previously determined destination address, is used for this purpose.

With the above and other objects in view there is also provided, in accordance with the invention, a device for transporting multiple items, comprising:

- a first processing system;
- at least one further processing system;
- at least one transport means; and
- a data storage device connected to each of the first and further processing systems;

the device being configured to execute multiple transport processes, wherein, in each transport process:

- at least one item respectively is transferred into a respective said transport means;
- said transport means with the at least one item is transported to one of said further processing systems; and
- the items transported with said transport means are fed to said further processing system such that firstly all the items from the respective transport means are fed to said further processing system, before further items are fed thereto;

said first processing system being configured:

- for each item, prior to the item being transferred into one of said transport means, to perform a first measurement as to whether the item does or does not have a given optically measurable characteristic and, if so, in what form the item possesses the characteristic;
- for each transport process, to determine and store in the data storage device the transport-process information as to which items are transported together by way of the transport process and what feature value which of these items assumes, and thereby using the result of the first measurement in each case; and
- to store the result of the first measurement as a component part of the transport-process information of the particular transport process by way of which this item is transported;

each further processing system being configured, for each item, after transportation of a transport means used in a given transport process to the respective said processing system:

- to measure whether at least one item which has the predefined characteristic was fed by means of this transport process to the processing system and, if so, in what form the item possesses the characteristic;
- to determine each transport process by means of which an item with this form of the characteristic was transferred into a transport means and transported therein, for which purpose the further processing system uses the stored transport-process information, and
- to use, for each item which was fed by means of this transport process to the further processing system, the set of transport processes determined in this manner as the result of the transport-process search.

Other features which are considered as characteristic for the invention are set forth in the appended claims.

Although the invention is illustrated and described herein as embodied in method and device for transporting items, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
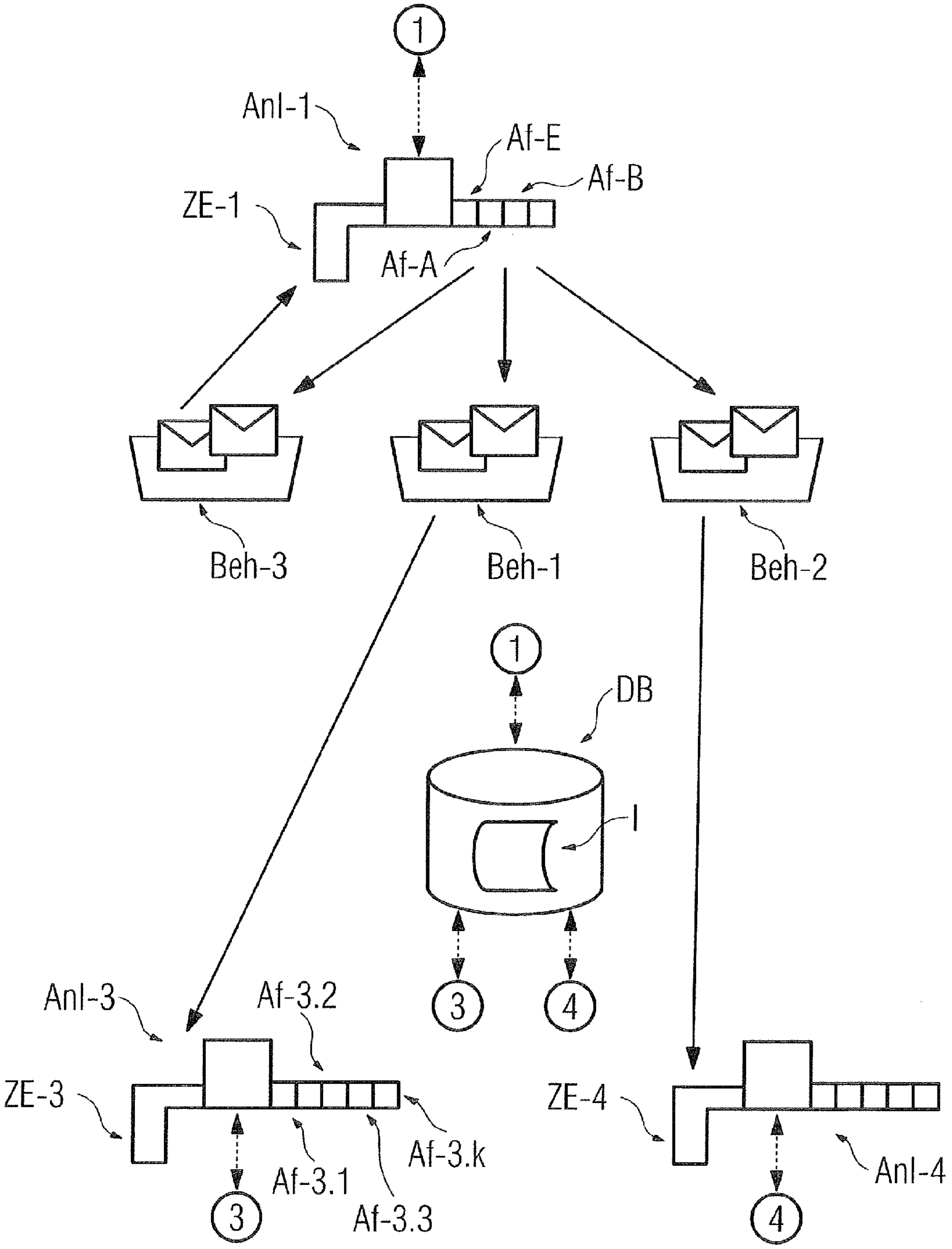
FIG. 1 shows a network comprising three processing systems.

In the figures, material flows are represented by solid lines and data flows by dashed lines.

In the exemplary embodiment, the items to be transported are mail items. Each mail item is furnished with an identification of the delivery address to which the postal item is to be transported. The delivery address functions as the destination point of the mail item. The identification has usually been affixed to the mail item before the commencement of transportation. It is, however, also possible that it will be affixed only during transportation.

Each mail item passes through a sorting system at least twice. It is possible for a mail item to pass through the same sorting system several times or through one sorting system three times.

During the first pass, at least the delivery address is determined. It is possible for further features to be measured, e.g. the weight of the mail item or the franking with which the mail item is provided.

Preferably, a reading device of the sorting system used during the first pass firstly attempts to determine the delivery address automatically by way of optical character recognition (OCR). If this is unsuccessful, then a person reads the delivery address and inputs at least a part of the read delivery address, e.g. the zip code.

A delivery area is assigned to each possible delivery address. During each pass, all mail items to the same delivery area are discharged into the same output compartment. It is possible for mail items to different delivery areas to be discharged into the same output compartment. It is possible for a mail item to pass through the same sorting system several times, for example because the number of output compartments is lower than the number of predefined delivery areas. In this case, n-pass sequencing is preferably executed. Such a method is described in the commonly assigned European patent EP 94 84 16 B1 and its counterpart U.S. Pat. No. 6,703,574 B1. After the first pass, the mail items which the sorting system has discharged into an output compartment are transferred into a container. The container is transported to the feeding device of the second sorting system, and the mail items are fed into the sorting system for the second pass.

It is also possible for a container with mail items which have passed through a sorting system for the first time to be transported to a different location and for the mail items to be fed there into a further sorting system. It is also possible for some mail items to be transported in a container from an output compartment of the further sorting system to a feeding device of another sorting system and for these mail items to be fed into the other sorting system.

It would be highly impractical if each further sorting system had to read afresh the delivery address which the first sorting system has already read. The traditional procedure for avoiding this is for the first sorting system to print a coding of the delivery address onto the mail item, for instance in the form of a bar code. Each further sorting system then reads this bar code.

However, it is frequently not desirable for a mail item to be furnished with a bar code. An agreement of the Universal Postal Union (UPU) provides that cross-border mail items shall not be furnished with a bar code, since different postal service providers normally use different coding systems.

Therefore, in the exemplary embodiment, a method is used which has come to be known by the name of "fingerprinting" or "virtual ID." It is described, for example, in the above-mentioned German patent DE 4000603 C2 and in European Patent EP 1222037 B1 and its counterpart U.S. Pat. No. 6,888,084. There, each further sorting system is enabled to determine without a bar code the delivery address which the first sorting system has read.

In the exemplary embodiment, m different features of a mail item are predefined which, as the mail item passes through a sorting system, can be measured optically without the mail item being damaged. Examples of such features are:

- a bar code on the front of the mail item,
- a bar code on the back of the mail item,
- dimensions of the mail item,
- the distribution of gray levels and/or color tones on a surface of the mail item,
- the position and dimension of the franking mark (e.g. stamp or franking machine),
- the position and size of the address block and/or of the details relating to the sender,
- a logo on the mail item, e.g. a logo of the sender or an advertising imprint, and
- features of the delivery address, e.g. the zip code.

Each mail item is not necessarily furnished with a bar code. However, even where a method of fingerprinting is applied, a considerable proportion of mail items may be furnished with a bar code. This bar code codes e.g. the delivery address of the mail item or distinguishes the mail item from all other mail items which pass through one of the sorting systems within a predefined period of time and is thus a machine-readable identifier of the mail item.

Referring now more specifically to FIG. 1, there is shown a network comprising three processing systems or installations Anl-1, Anl-3 and Anl-4. These three processing systems are configured in the exemplary embodiment as sorting systems. Each sorting system has a feeding device in the form of a feeder, a reading device and a multiplicity of output compartments. Mail items are fed into the feeder of such a sorting system. The feeder separates the mail items. The separated mail items then pass through the sorting system. The reading device generates an image of the mail item. Using the image, the sorting system determines the delivery address and discharges the mail item into one of the output compartments, depending on the delivery address recognized. Each of the three sorting systems Anl-1, Anl-3 and Anl-4 and a further sorting system Anl-2 is connected to a central database DB and has read and write access to this database DB.

In the example shown in FIG. 1, postal items are firstly fed into the feeder ZE-1 of the sorting system Anl-1. The sorting system Anl-1 generates a digital image of each mail item and determines the delivery address. The sorting system Anl-1 firstly attempts to determine the delivery address automatically by means of optical character recognition (OCR). If this is unsuccessful, the image is transmitted to a video coding station, and an operator inputs the delivery address—or at least the zip code—manually. The sorting system Anl-1 discharges the mail item into one of the output compartments, depending on the delivery address determined respectively.

In the example of FIG. 1, three output compartments Af-A, Af-B and Af-E of the sorting system Anl-1 are shown. The mail items which the sorting system Anl-1 has discharged into the output compartment Af-E are transferred in the example from FIG. 1 into a container Beh-3. The container Beh-3 with these mail items is transported again to the feeder ZE-1 of the sorting system Anl-1. The mail items from the container Beh-3 are separated by the feeder ZE-1 and pass afresh through the sorting system Anl-1.

In the exemplary embodiment, containers function as the transport means. Instead of containers, other transport means can also be used. The mail items from the output compartment Af-E of the sorting system Anl-1 can be transported, e.g. also with a conveyor belt or by means of a reloading bridge, to the feeding device ZE-1 of Anl-1 again.

The mail items which the sorting system Anl-1 has discharged into the output compartment Af-A are transferred in the example from FIG. 1 into a container Beh-2. The container Beh-2 with these mail items is transported to the feeder ZE-2 of the second sorting system Anl-2. The mail items from the container Beh-2 are separated by the feeder ZE-2 and pass through the sorting system Anl-2. Analogously, the same occurs with the mail items which the first sorting system Anl-1 has discharged into the output compartment Af-B. These are transported in the container Beh-3 to the feeder ZE-3 of the third sorting system Anl-3.

In the example of FIG. 1, the mail items are fed from the output compartment Af-E to the feeding device ZE-1 again and pass afresh though the installation Anl-1. One reason for this may be that n-pass sequencing is executed, as just described. It is also possible for individual mail items to pass through the sorting system Anl-1 several times because off-line video coding is executed. During the first pass, a digital image of the mail item is generated. If the address in this image cannot be recognized automatically, the image is transmitted to a video coding station. There, the address is input manually. After this has happened, the mail item passes through the sorting system afresh and is discharged into an output compartment, depending on the address input. It is also possible for mail items to be consigned within a location or delivery area, and the first sorting system Anl-1 therefore executes both the incoming sorting and the subsequent outgoing sorting for these mail items.

The two remaining sorting systems Anl-3 and Anl-4 use afresh the reading result which the sorting system Anl-1 has obtained. In order to make this possible, the sorting system Anl-1 generates for each mail item that passes through the sorting system Anl-1 a data record and stores it in the central database DB as part of transport information I. This data record comprises

- an internal identifier of the mail item and
- an identification for the delivery address which the first sorting system Anl-1 has read.

Each further sorting system through which the mail item passes, recognizes this mail item. The aforementioned m features which are optically measurable are therefore predefined.

The first sorting system Anl-1 determines for each mail item which passes through the sorting system Anl-1 what value each predefined feature of this mail item assumes respectively. In this way, the first sorting system Anl-1 generates a feature vector (or more precisely: a feature-value vector), which, where n features are predefined, consists of n feature values. The first sorting system Anl-1 supplements the data record for the mail item with the feature vector, i.e. with an identification of the n feature values.

The third sorting system Anl-3 also measures for each mail item which passes through the sorting system Anl-3 what value each predefined feature assumes for this mail item. In this way, the third sorting system Anl-3 also generates a feature vector comprising n feature values. The third sorting system Anl-3 executes a read access to the central database DB. The feature vectors of stored data records are compared with the currently measured feature vector. In this way, the data record which originates from the mail item currently under examination is determined. This data record comprises the delivery address of the mail item which the first sorting system Anl-1 has read.

In this embodiment, a coding of the delivery address to which a mail item is to be transported is stored respectively in the data record of the mail item. This delivery address functions as the processing attribute of the item. In other embodiments, other processing attributes, e.g. a weight or a dimension or a surface characteristic of the mail item, are additionally measured and stored during the first sorting pass.

Figure 2:
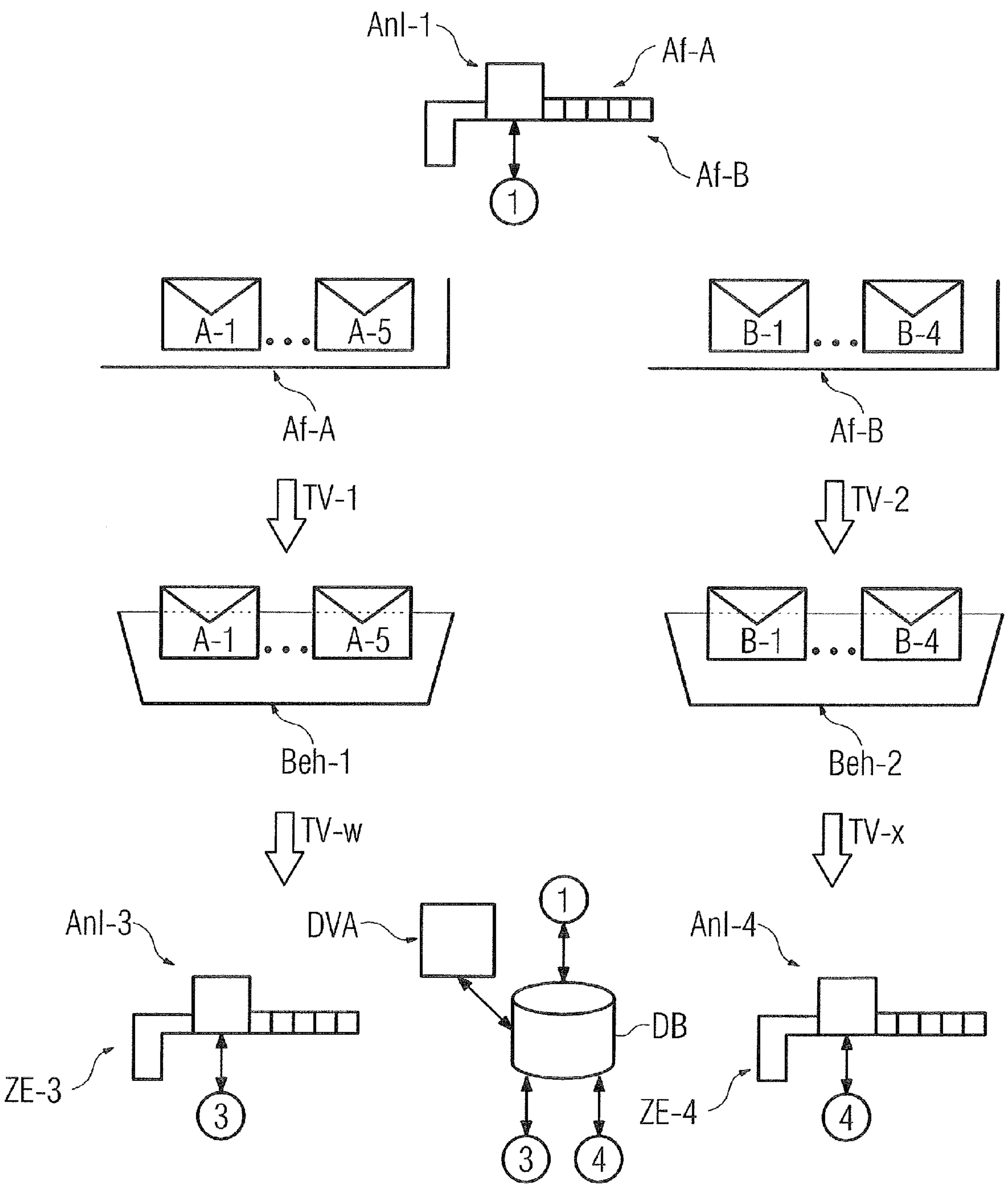
FIG. 2 shows the transportation of the mail items A1, . . . , A5 and B1, . . . , B4.

FIG. 2 illustrates the transportation of mail items A1, . . . , A5 and B1, . . . , B4. The mail items A1, . . . , A5 and B1, . . . B4 pass firstly through the first sorting system Anl-1. The reading device of this first sorting system Anl-1 reads the respective identification of the delivery address with which the mail items A1, . . . , A5, B1, . . . B4 and further mail items passing through are furnished. A measuring device of the first sorting system Anl-1 measures what values the predefined features assume for the mail items A1, . . . , A5. This measuring device also measures what values the predefined features assume for the mail items B1, . . . , B4.

Figure 3:
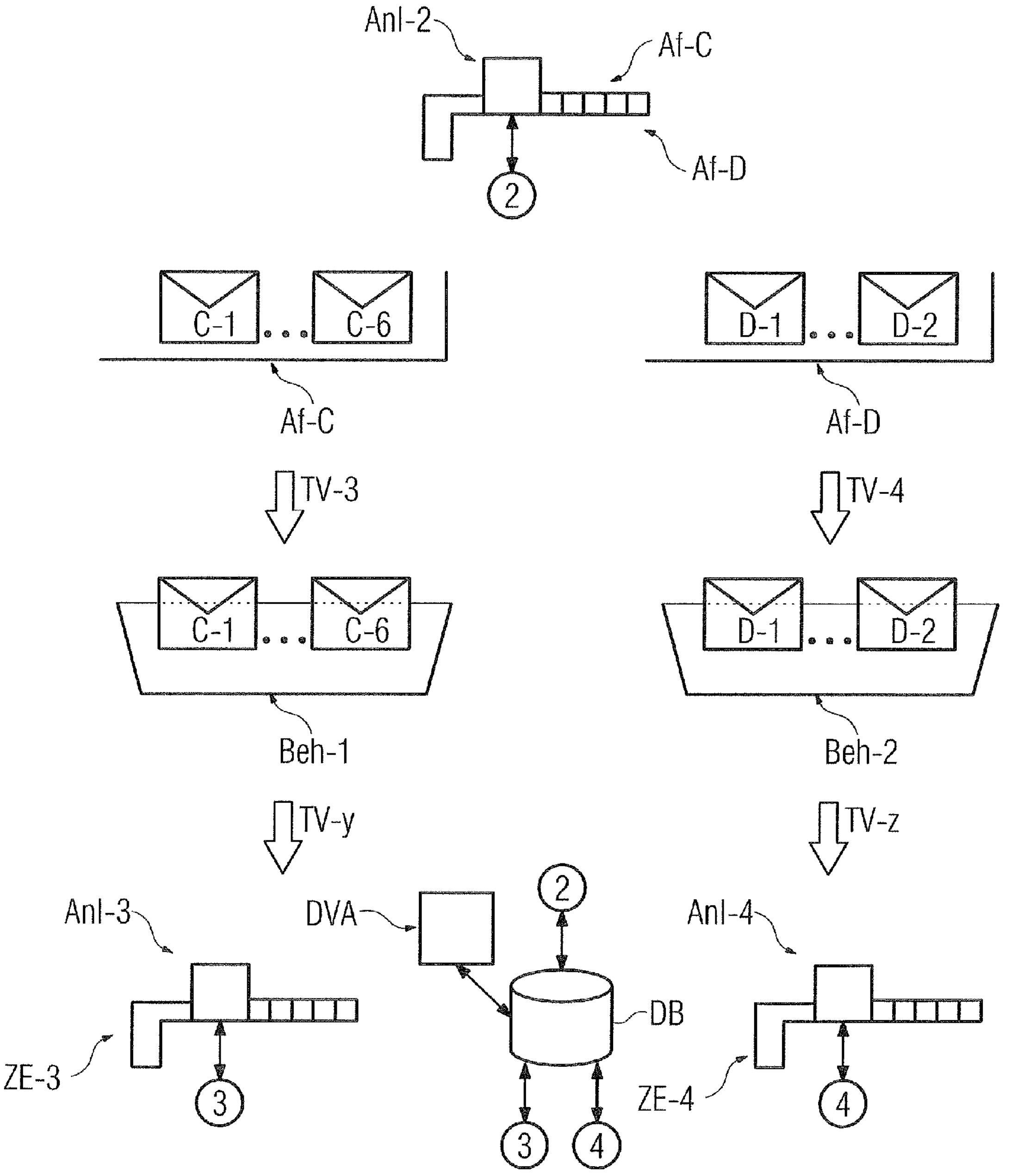
FIG. 3 shows the transportation of the mail items C1, . . . , C6 and D1 and D2.

FIG. 3 illustrates the transportation of the mail items C1, . . . , C6 and D1 and D2. The mail items C1, . . . C6 pass through a second sorting system Anl-2. A reading device of this second sorting system Anl-2 reads the respective identification of the delivery address with which the mail items C1, . . . C6, D1, D2 and further mail items passing through are furnished. A measuring device of the second sorting system Anl-2 measures what values the predefined features assume for the mail items C1, . . . , C6. This measuring device also measures what values the predefined features assume for the mail items D1 and D2.

In the exemplary embodiment, a transport process is thus characterized by:

- an output compartment of a sorting system as the starting point of the transport process,
- a feeding device of a sorting system as the destination point of the transport process,
- the mail items which are transported in this transport process.

In the exemplary embodiment, each sorting system registers which mail items it discharges into which output compartment. Each sorting system also registers which transport processes commence from this sorting system.

In the exemplary embodiment, two of the total of m features are predefined as specially identified optically recordable characteristics, namely

- the presence of a machine-readable identification, e.g. a bar code or a matrix code, on the front of the mail item (Merk_V) and
- the presence of a machine-readable identification, e.g. a bar code or a matrix code, on the back of the mail item (Merk_R).

These two features are "globally definite" i.e. a mail item with a certain form of one of these features is globally unique among the mail items which pass through the sorting systems within a certain period. In the exemplary embodiment, the identification is one which clearly identifies the mail item.

The first sorting system Anl-1 and the second sorting system Anl-2 register information about transport processes. This transport-process information I_TV-1, I_TV-2, I_TV-3, I_TV-4 is also stored in the central database DB.

The following transport-process information I_TV-1 is stored about the first transport process TV-1:

| Output compartment | Mail item | Form of Merk_V | Form of Merk_R |
|---|---|---|---|
| Af-A | A-1 | | |
| Af-A | A-2 | | |
| Af-A | A-3 | 01224 | |
| Af-A | A-4 | | aldkrje |
| Af-A | A-5 | | |

The symbol ./. signifies that the mail item concerned does not carry a bar code on the front or back.

The transport-process information I_TV-1 comprises furthermore the respective value of every other feature, for the five mail items A-1 to A-5, which is not shown in the table.

The corresponding transport-process information I_TV-2, I_TV-3, I_TV-4 about the remaining three transport processes TV-2, TV-3 und TV-4 is also stored.

In the transport process TV-1, the mail items A-1, . . . , A-5 are transported in the first container Beh-1 from the output compartment Af-A of the first sorting system Anl-1 to the feeding device ZE-3 of the third sorting system Anl-3. However, the invention saves on the need for the third sorting system Anl-3 to measure an identifier of the first container Beh-1 and a time at which the transport process TV-1 was started or terminated. It suffices for the third sorting system Anl-3 to register that a transport process TV-w has reached the feeding device ZE-3. The third sorting system Anl-3 also registers which mail items that pass through the third sorting system Anl-3 were transported in this transport process TV-w to the third sorting system Anl-3. Correspondingly, the fourth sorting system Anl-4 registers that a transport process TV-x comprising the mail items B-1, . . . , B-4 has reached the feeding device ZE-4.

The mail items A1, . . . , A5 are separated by the feeding device ZE-3 of the third sorting system Anl-3. A measuring device of the third sorting system Anl-4 measures afresh what values the predefined features assume for the mail items A1, . . . , A5. In the exemplary embodiment, these are the values of the two identified features Merk_V and Merk_R and the values of further features.

The mail items B1, . . . , B4 are separated by the feeding device ZE-4 of the fourth sorting system Anl-4. A measuring device of the fourth sorting system Anl-4 measures afresh what values the predefined features assume for the mail items B1, . . . , B4. The same applies by analogy to the mail items C1, . . . , C6, D1 and D2.

Whenever a mail item passes through a sorting system afresh, a search is executed in the central database DB for the data record which has been stored for this mail item. Thus, if the mail item A-1 passes through the third sorting system Anl-3, a search is executed in the central database DB for the data record for the postal assignment A-1. This data record was created when the mail item A-1 passed through the first sorting system Anl-1.

Each data record for a mail item comprises:

- the read identification of the delivery address of the mail item,
- the feature values measured for this mail item
- and preferably the information on the cluster to which the feature values measured for this mail item belong.

Also stored is the information on the transport process—or transport processes—by means of which each mail item is transported away from a sorting system. This information is stored as part of the transport-process information.

In order to find this data record, the feature values which have been measured for a mail item during a fresh measurement are compared with feature values of stored data records. This comparison is performed automatically by a data processing system which is connected to the central database DB. It would be very time-consuming if in this process the measured feature values had to be compared with the feature values of all stored data records. A preselection is therefore undertaken among the stored data records.

The third sorting system Anl-3 therefore executes a restriction of the search space and determines firstly from which outgoing transport process the mail items of an incoming transport process originate.

The third sorting system Anl-3 establishes that mail items from a transport process Tv-w are passing through the third sorting system Anl-3. The measuring device of the third sorting system Anl-3 measures, of the first n mail items passing through, the two values respectively which the two identified features Merk_V and Merk_R assume for these n mail items. In the exemplary embodiment, these two features Merk_V and Merk_R are the presence of a bar code or a matrix code on the front and of a bar code or matrix code on the back and the respectively coded character sequence—or the finding that the mail item has no bar code on the front and/or none on the back.

In the exemplary embodiment, the mail items from the transport process Tv-w pass through the third sorting system Anl-3 in the sequence A-1, A-2, . . . , A-5. The sequence among the mail items does not, however, have to be adhered to.

Firstly, n=2. A safety limit of s_min>=1 and a maximum number n_max>=2 are predefined. The measurements are interrupted as soon as

- either among the first n mail items there are s mail items which have one of the predefined identified characteristics, where s>=s_min or
- n_max mail items were measured in total.

In the exemplary embodiment, s_min=2, and n_max=5. Firstly, n=n0=2. The third sorting system Anl-3 counts how many mail items among the n mail items have a predefined characteristic, i.e. in this case have a bar code. If this number is s, this establishes that among the first n=2 mail items, there is no mail item with a bar code, i.e. s=0.

Now n is increased by 1, i.e. n=3. The sorting system Anl-3 establishes that among the first n=3 mail items, there is s=1 which possesses a bar code, namely the bar code for "01224" on the front. For this mail item, the feature Merk_V thus assumes the value "01224".

However, because s<s_min still applies, n is again increased by 1, i.e. n=4. The sorting system Anl-3 establishes that among the first n=4 mail items, there are s=2 mail items which respectively possess a bar code. A mail item carries the bar code for "01224" on the front, another the bar code for "aldkrje" on the back. Now s>=s_min applies, and the measurements are interrupted.

In the exemplary embodiment, the central database DB is searched for the transport-process information. Here, each outgoing transport process is determined which comprises a mail item in which the feature Merk_V assumes the value "01224", and which also comprises a mail item in which the feature Merk_R assumes the value "aldkrje".

The transport process TV-1 is determined to be the only transport process. From this it follows that the incoming transport process TV-w is identical to the transport process TV-1.

The upper limit n_max is used so that the full measurement of each mail item does not start too late. If the transport process cannot be determined after at most n_max mail items, it is no longer determined at all in the exemplary embodiment, and no search-space restriction is executed.

All m feature values of each mail item are now measured. With the aid of these m feature values, the data record for this mail item in the central database DB is determined. For each mail item from the transport process TV-w=TV-1, a search is made for the data record which was stored for this mail item in the central database DB. This search is restricted to those data records which originate from mail items which were transported in the transport process TV-1. The transport-process information I_TV-1 and the m feature values of the mail item are used for this search.

Figure 4:
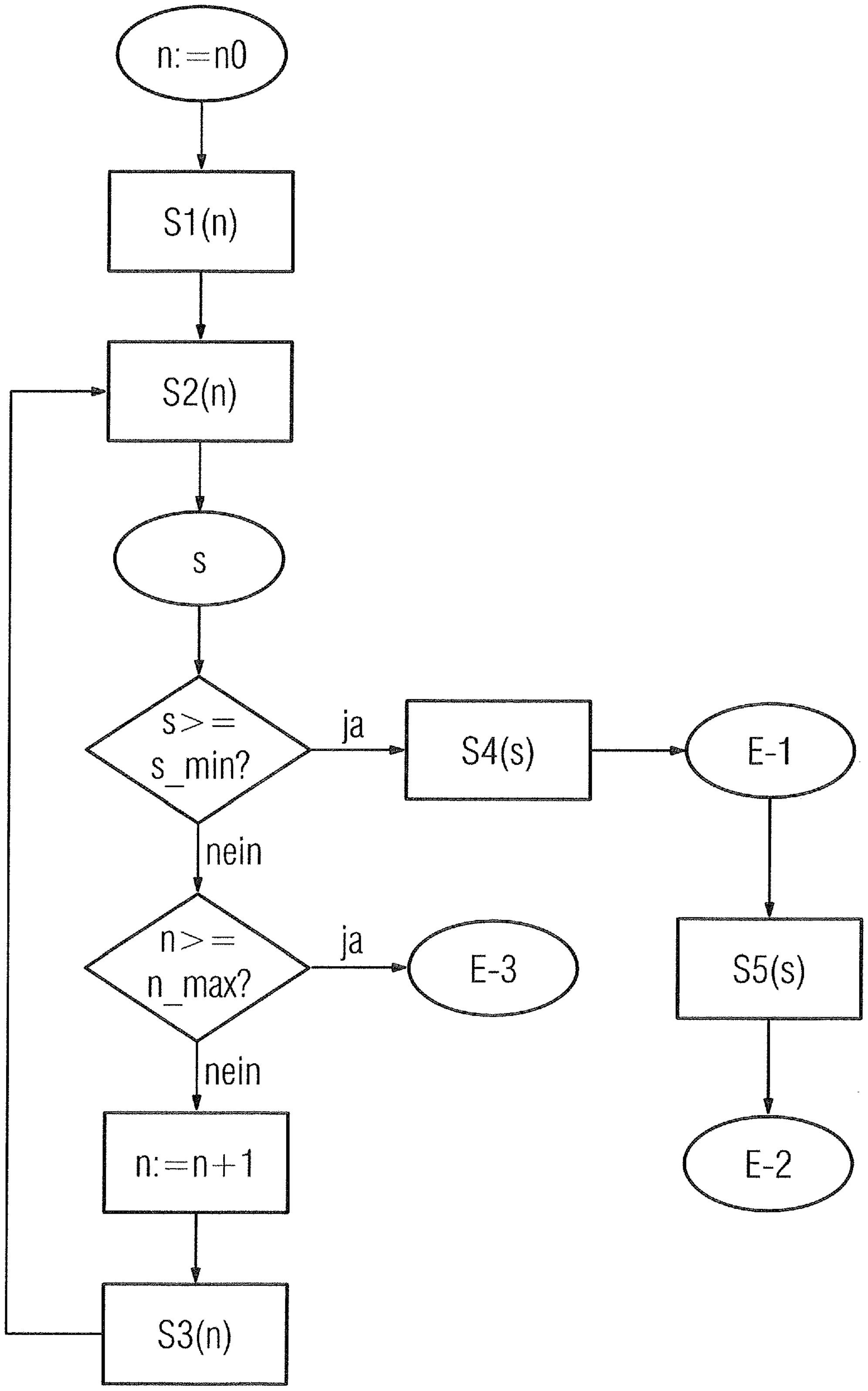
FIG. 4 shows the search for mail items having globally definite features with the aid of a flow diagram.

FIG. 4 illustrates this sequence for searching for mail items with globally definite features with the aid of a flow diagram. The reference characters have the following meanings:

S1(*n*) is the step whereby the first n mail items passing though are gauged, the two values of the two features Merk_V and Merk_R of each of these n mail items being measured.

S2(*n*) is the step whereby a count is made of how many of these n mail items possess at least one predefined characteristic, i.e. in the exemplary embodiment possess a bar code on the front or on the back. This number is designated s.

S3(*n*) is the step whereby the now nth [previously (n+1)th mail item is gauged, measurements being made of what values the two features Merk_V and Merk_R assume for this mail item.

S4(*s*) is the step whereby the at least s forms are determined for the s mail items found with at least one identified characteristic.

E1 is the result which consists of the at least s forms which were found by means of step S4(*s*).

S5(*s*) is the step whereby a search is made for an outgoing transport process which comprises s mail items which have precisely the s forms from E1 which were found in step S4(*s*). The transport-process information is used for this search.

E2 is the result which consists of the transport processes found by means of E1. The search for the data records for mail items is then restricted to the mail items from these determined transport processes.

E3 is the result that no search-space restriction by means of globally definite features is possible.

As a benefit of the invention, it is not necessary to read a machine-readable identifier on the container in which the mail items were transported in transport process TV-1=TV-w. It is also not necessary to adhere to a defined sequence among these mail items. The first sorting system Anl-1 can thus discharge the mail items into the sorting compartment Af-A in a different sequence from that in which these mail items later pass through the feeding device ZE-3 of the third sorting system Anl-3.

The following table should aid the reader in understanding the various reference characteristics used herein:

| Reference characters | Meaning |
|---|---|
| A-1, . . . , A-5 | Postal consignments which are transported in the transport process TV-1 from the sorting installation Anl-1 to the sorting installation Anl-3 |
| Af-A | Output compartment of the sorting installation Anl-1, into which the postal consignments A-1, . . . , A-5 are discharged |
| AF-B | Output compartment of the sorting installation Anl-1, into which the postal consignments B-1, . . . , B-4 are discharged |
| AF-C | Output compartment of the sorting installation Anl-2, into which the postal consignments C-1, . . . , C-6 are discharged |
| AF-D | Output compartment of the sorting installation Anl-2, into which the postal consignments D-1 and D-2 are discharged |
| AF-E | Output compartment of the sorting installation Anl-1 |
| Anl-1, Anl-2 | Sorting installations from which transport processes start |
| Anl-3, Anl-4 | Sorting installations to which transport processes are executed |
| B-1, . . . , B-4 | Postal consignments which are transported in the transport process TV-2 from the sorting installation Anl-1 to the sorting installation Anl-4 |
| Beh-1 | Container which is used in the transport processes TV-1 and TV-3 |
| Beh-2 | Container which is used in the transport processes TV-2 and TV-4 |
| C-1, . . . , C-6 | Postal consignments which are transported in the transport process TV-3 from the sorting installation Anl-2 to the sorting installation Anl-3 |
| D-1, D2 | Postal consignments which are transported in the transport process TV-4 from the sorting installation Anl-2 to the sorting installation Anl-4 |
| DB | Central database, is connected to all the sorting installations and to the data processing system DVA |

-continued

| Reference characters | Meaning |
|---|---|
| DVA | Data processing system, searches in the central database DB for data records |
| Merk_R | Predefined characteristic: bar code on the back of the postal consignment? |
| Merk_V | Predefined characteristic: bar code on the front of the postal consignment? |
| TV-1 | Transport process starting from the sorting installation Anl-1, by means of which the postal consignments A-1, . . . , A-5 are transported to the sorting installation Anl-3 |
| TV-2 | Transport process starting from the sorting installation Anl-1, by means of which the postal consignments B-1, . . . , B-4 are transported to the sorting installation Anl-4 |
| TV-3 | Transport process starting from the sorting installation Anl-2, by means of which the postal consignments C-1, . . . , C-6 are transported to the sorting installation Anl-3 |
| TV-4 | Transport process starting from the sorting installation Anl-2, by means of which the postal consignments D-1 and D-2 are transported to the sorting installation Anl-4 |
| TV-w | Incoming transport process, by means of which the postal consignments A-1, . . . , A-5 reach the sorting installation Anl-3 |
| TV-x | Incoming transport process, by means of which the postal consignments B-1, . . . , B-4 reach the sorting installation Anl-4 |
| TV-y | Incoming transport process, by means of which the postal consignments C-1, . . . , C-6 reach the sorting installation Anl-3 |
| TV-z | Incoming transport process, by means of which the postal consignments D-1 and D-2 reach the sorting installation Anl-4 |
| ZE-1 | Feeding device of the sorting installation Anl-1 |
| ZE-2 | Feeding device of the sorting installation Anl-2 |
| ZE-3 | Feeding device of the sorting installation Anl-3 |

The invention claimed is:

1. A method for transporting multiple items, the method which comprises:

performing multiple transport processes each including the following steps:

transferring at least one item respectively into a transport means;

transporting the transport means with the at least one item to a processing system; and feeding all of the items transported with the transport means to the processing system before further items are fed to the processing system; and performing a first measurement for each item as to whether or not the item possesses a given optically measurable characteristic and, if so, in what form the item possesses the characteristic, before the item is transferred into one of the transport means;

determining and storing for each transport process transport-process information as to which items are transported together by way of the specific transport process, and storing the result of the first measurement as a component part of the transport-process information of the particular transport process by means of which the specific item is transported;

for each transport process, after transportation of the transport means to the respective processing system:

measuring whether or not at least one item with the predefined characteristic was fed by way of the respective transport process to the processing system and, if so, in what form the item possesses the characteristic;

determining, from the stored transport-process information, each transport process by way of which an item with the given form of the characteristic was transferred into a transport means and transported therein; and performing a transport-process search to ascertain the transport process with which the item has been transported and thereby using as a result of the search, for each item which was fed by means of this transport process to the processing system, the set of transport processes thus determined.

2. The method according to claim 1, which further comprises:

predefining as a further optically measurable characteristic, which an item either has in one of various possible further forms or does not have;

for each item, in the first measurement:

performing an additional measurement as to whether or not the item has the predefined further characteristic or not and, if so, in what further form the item possesses the further characteristic, and storing the further measurement result as an additional component part of the transport-process information of the particular transport process by means of which the item is transported;

for each transport process, after transportation of the transport means to the respective processing system:

performing an additional measurement as to whether or not at least one item which has the predefined further characteristic was fed to the processing system by means of the respective transport process and, if so, in what further form the item possesses the further characteristic, and wherein the step of determining the transport processes includes the step of determining each transport process, by means of which both an item having the form of the characteristic and an item having the further form of the further characteristic were transferred into a transport means and transported therein, and thereby using the stored transport-process information.

3. The method according to claim 1, which comprises:

for each transport process, after transportation of the transport means to the respective processing system:

executing a search for a number s_min items which were fed by means of the respective transport process to the respective processing system and possess the predefined characteristic, where s_min≧1 is a predefined minimum number;

then, when s_min such items are found, measuring the s_min forms of the items; and the step of determining the transport processes includes a step of determining each transport process by way of which s_min items comprising the measured s_min forms are transported.

4. The method according to claim 1, which further comprises:

for each item, before the item is transferred into one of the transport means:

measuring what value at least one predefined transport attribute assumes for the item;

generating and storing a data record for the item, the data record comprising a coding of the measured transport-attribute value and each feature value measured during the first measurement;

for each item, after the item has been fed to the respective processing system:

determining the stored data record for the item, thereby using each feature value measured during a fresh measurement;

restricting the search to the data records of those items which were transported in one of the determined transport processes; and triggering further transportation of the item, and thereby using the transport-attribute value from the determined data record.

5. The method according to claim 4, wherein:

at least one item with details relating to a destination to which the item is to be transported is used;

the destination details as the transport-attribute value of the item is used; and the processing system to which the item was transported triggers transportation of the item to the particular destination whose coding is encompassed by the determined data record.

6. A device for transporting multiple items, comprising:

a first processing system;

at least one further processing system;

at least one transport means; and a data storage device connected to each of said first and further processing systems;

the device being configured to execute multiple transport processes, wherein, in each transport process:

at least one item respectively is transferred into a respective said transport means;

said transport means with the at least one item is transported to one of said further processing systems; and the items transported with said transport means are fed to said further processing system such that firstly all the items from the respective transport means are fed to said further processing system, before further items are fed thereto;

said first processing system being configured:

for each item, prior to the item being transferred into one of said transport means, to perform a first measurement as to whether the item does or does not have a given optically measurable characteristic and, if so, in what form the item possesses the characteristic;

for each transport process, to determine and store in the data storage device the transport-process information as to which items are transported together by way of the transport process; and to store the result of the first measurement as a component part of the transport-process information of the particular transport process by way of which this item is transported;

each further processing system being configured, for each item, after transportation of a transport means used in a given transport process to the respective said processing system:

to measure whether at least one item which has the predefined characteristic was fed by means of this transport process to the processing system and, if so, in what form the item possesses the characteristic;

to determine each transport process by means of which an item with this form of the characteristic was transferred into a transport means and transported therein, for which purpose the further processing system uses the stored transport-process information, and to use, for each item which was fed by means of this transport process to the further processing system, the set of transport processes determined in this manner as the result of the transport-process search.

* * * * *